(12) United States Patent
Sun (10) Patent No.: US 11,204,741 B2
(45) Date of Patent: Dec. 21, 2021

(54) DEVICE AND METHOD FOR TRANSPOSING MATRIX, AND DISPLAY DEVICE

(71) Applicant: BOE TECHNOLOGY GROUP CO., LTD., Beijing (CN)

(72) Inventor: Gaoming Sun, Beijing (CN)

(73) Assignee: BOE TECHNOLOGY GROUP CO., LTD., Bejing (CN)

( * ) Notice: Subject to any disclaimer, the term of this patent is extended or adjusted under 35 U.S.C. 154(b) by 0 days.

(21) Appl. No.: 16/760,325

(22) PCT Filed: Sep. 23, 2019

(86) PCT No.: PCT/CN2019/107365
§ 371 (c)(1),
(2) Date: Apr. 29, 2020

(87) PCT Pub. No.: WO2020/073795
PCT Pub. Date: Apr. 16, 2020

(65) Prior Publication Data
US 2020/0341735 A1    Oct. 29, 2020

(30) Foreign Application Priority Data
Oct. 8, 2018  (CN) .......................... 201811167839.9

(51) Int. Cl.
*G06F 7/78*    (2006.01)
(52) U.S. Cl.
CPC ...................... *G06F 7/78* (2013.01)
(58) Field of Classification Search
CPC .. G06F 7/78; G06F 17/16; G06F 9/345–3455; G06T 3/00–608; G11C 11/005–5692
(Continued)

(56) References Cited

U.S. PATENT DOCUMENTS 4,903,231 A * 2/1990 Artieri .................... G11C 19/28
711/1
4,918,527 A * 4/1990 Penard .................... G06F 7/785
348/718
(Continued)

FOREIGN PATENT DOCUMENTS

CN    1122026 A    5/1996
CN    101706760 A    5/2010
(Continued)

OTHER PUBLICATIONS

International Search Report and Written Opinion dated Dec. 19, 2019 for PCT Patent Application No. PCT/CN2019/107365.
(Continued)

*Primary Examiner* — Aimee Li
*Assistant Examiner* — Carlo Waje
(74) *Attorney, Agent, or Firm* — Thomas | Horstemeyer, LLP (57) ABSTRACT

The present disclosure relates to a matrix transposition device and method, and a display device. The matrix transposition device includes a first counting unit, an input module, second counting units, and a first data selection unit. The first counting unit numbers a matrix element and outputs a first signal. The input module is coupled to the first counting unit, and is input with the matrix element after receiving the first signal; each. Each column of matrix elements corresponds to one of the second counting units, each of the second counting units outputs a set of second signals, and each set of the second signals includes number information of the matrix elements in a column corresponding to the second counting unit. The first data selection unit receives the second signals in an order of columns of a matrix, and orderly outputs column elements of the matrix as row elements of a transposed matrix.

17 Claims, 3 Drawing Sheets

(58) Field of Classification Search
USPC .................................................. 708/400–424
See application file for complete search history.

(56) References Cited

U.S. PATENT DOCUMENTS

| | | | | |
|---|---|---|---|---|
| 5,481,487 | A * | 1/1996 | Jang | G06F 17/147 |
| | | | | 708/401 |
| 5,805,476 | A | 9/1998 | Kim et al. | |
| 5,938,763 | A * | 8/1999 | Fimoff | G06F 7/785 |
| | | | | 712/300 |
| 6,021,420 | A * | 2/2000 | Takamuki | G06F 7/785 |
| | | | | 708/401 |
| 6,693,903 | B1 * | 2/2004 | Shively | H04B 7/18515 |
| | | | | 370/370 |
| 7,231,413 | B2 * | 6/2007 | Natsume | G06F 7/785 |
| | | | | 708/401 |
| 9,952,831 | B1 * | 4/2018 | Ross | G11C 7/1012 |
| 2009/0031089 | A1 * | 1/2009 | Tuominen | G11C 7/1006 |
| | | | | 711/149 |
| 2010/0017450 | A1 * | 1/2010 | Sun | G06F 9/30036 |
| | | | | 708/401 |
| 2011/0264723 | A1 * | 10/2011 | Yagain | G06F 17/16 |
| | | | | 708/402 |
| 2014/0003742 | A1 * | 1/2014 | Nishimura | G06F 9/30109 |
| | | | | 382/305 |
| 2015/0098410 | A1 | 4/2015 | Jöngren et al. | |
| 2016/0374098 | A1 | 12/2016 | Jöngren et al. | |
| 2018/0232207 | A1 * | 8/2018 | Ichimiya | G06F 7/78 |

FOREIGN PATENT DOCUMENTS

| | | | |
|---|---|---|---|
| CN | 103168289 A | 6/2013 | |
| CN | 105282556 A | 1/2016 | |
| CN | 205721754 U | 11/2016 | |
| CN | 108053855 A | 5/2018 | |
| CN | 108169716 A | 6/2018 | |
| CN | 108446252 A | 8/2018 | |
| CN | 109408117 A | 3/2019 | |
| EP | 3047587 A1 | 7/2016 | |
| WO | WO-2011064898 A1 * | 6/2011 | ......... G06F 15/8015 |
| WO | 2015040579 A1 | 3/2015 | |

OTHER PUBLICATIONS

1st Office Action dated Jun. 9, 2020 for Chinese Patent Application No. 201811167839.9.

* cited by examiner

DEVICE AND METHOD FOR TRANSPOSING MATRIX, AND DISPLAY DEVICE

CROSS-REFERENCE TO RELATED APPLICATIONS

This application is based upon International Application No. PCT/CN2019/107365, filed on Sep. 23, 2019, which is based upon and claims priority to Chinese Patent Application No. 201811167839.9, filed on Oct. 8, 2018, where the entire contents thereof are incorporated herein by reference.

TECHNICAL FIELD

The present disclosure relates to the field of computer technology and, in particular, to a matrix transposition device and method, and a display device.

BACKGROUND

In the process of algorithm development, there may be a large number of matrix operations, including a matrix transposition, a matrix inversion, a matrix multiplication, and the like. Among them, the matrix transposition is one of the most basic operations.

Presently, the matrix transposition is usually carried out by means of dual-port RAM or ROM, which performs a transposition operation on data by reading in and out an address. Such method has notable advantages for processing a large amount of data, but for a small amount of data, it consumes too much logic resources and is not easily implemented as a circuit.

It should be noted that the information disclosed in the above background section is only for enhancing the understanding of the background of the present disclosure and therefore, may include information that does not constitute prior art known to those of ordinary skill in the art.

SUMMARY

The present disclosure is to a matrix transposition device and method, and a display device.

According to an aspect of the present disclosure, there is provided a matrix transposition device, including:

a first counter configured to number a matrix element and output a first signal;

an input circuit coupled to the first counter, and being input with the matrix element after receiving the first signal;

a plurality of second counters, wherein each column of matrix elements corresponds to one of the second counters, each of the second counters outputs a set of second signals, and each set of the second signals comprises number information of the matrix elements in a column corresponding to the second counter; and a first data selector having an input end coupled to the input circuit and a selection end coupled to the plurality of second counters, configured to receive the second signals in an order of columns of a matrix, and orderly output column elements of the matrix corresponding to each set of the second signals as row elements of a transposed matrix.

According to an embodiment of the present disclosure, the input circuit includes:

a second data selector having a selection end coupled to the first counter and configured to receive the first signal and configured to be input with the matrix element.

According to an embodiment of the present disclosure, the second data selector includes:

a first multiplexer having a selection end coupled to the first counter and an input end to be input with the matrix element when receiving the first signal;

an AND gate unit having one input end coupled to the counting device and another input end to be input with a fixed value of 1; and a second multiplexer having an input end coupled to an output end of the first multiplexer and a selection end coupled to an output end of the AND gate unit, and configured to stop outputting when the first counter is cleared.

According to an embodiment of the present disclosure, the input circuit further includes:

a data memory configured to store the matrix elements as input, and having an output end coupled to the second data selector.

According to an embodiment of the present disclosure, the matrix transposition device further includes:

a register having an input end coupled to the input circuit and an output end coupled to the first data selector, and configured to store the matrix elements as numbered.

According to an embodiment of the present disclosure, a number of the second counters is the same as a number of the columns of the matrix, wherein each of the second counters corresponds to one column of the matrix elements.

According to an embodiment of the present disclosure, the second counter counts once every N-1 element intervals from a serial number of the column corresponding to the second counter, and outputs one of the second signals, where N is a total number of the columns in the matrix, and the second signal comprises the serial number of the matrix elements currently counted.

According to an embodiment of the present disclosure, the first data selector receives the second signal and outputs the matrix element corresponding to the serial number of the matrix data in the second signal.

According to a second aspect of the present disclosure, there is provided a matrix transposition method, including:

a first counter numbering a matrix element and outputting a first signal;

an input circuit receiving the first signal and being input with the matrix element;

each of a plurality of second counters orderly outputting a set of second signals in an order of columns of a matrix; and a first data selector receiving a plurality sets of the second signals, and orderly outputting, according to the order of the columns of the matrix, a column of the matrix elements corresponding to a serial number of the matrix elements in each set of the second signals as row elements of a transposed matrix.

According to an embodiment of the present disclosure, the step of a first counter numbering a matrix element and outputting a first signal includes:

the first counter counting and numbering the matrix element, and outputting one of the first signals for each count.

According to an embodiment of the present disclosure, the step of an input circuit receiving the first signal and being input with the matrix element includes:

a first multiplexer receiving the first signal being input with the matrix element as numbered, and transmitting the matrix element as numbered to a second multiplexer; and the second multiplexer outputting the matrix element as numbered, wherein after the first counter is cleared, a AND gate unit outputs 0 and the second multiplexer stops outputting.

According to a third aspect of the present disclosure, there is provided a display device, including the matrix transposition device provided by the present disclosure.

It should be noted that the above general description and the following detailed description are merely exemplary and explanatory and should not be construed as limiting of the present disclosure.

BRIEF DESCRIPTION OF THE DRAWINGS

The drawings herein are incorporated into and constitute a part of the specification, show embodiments consistent with the present disclosure, and are used to explain the principles of the present disclosure together with the specification. Understandably, the drawings in the following description are only some embodiments of the present disclosure. Those of ordinary skill in the art may obtain other drawings based on these drawings without paying any creative labor.

DETAILED DESCRIPTION

Example embodiments will now be described more fully with reference to the drawings. However, the example embodiments may be implemented in various forms and should not be construed as being limited to the examples set forth herein. Rather, embodiments are provided so that the present disclosure is comprehensive and complete, and fully conveys the concept of the example embodiments to those skilled in the art. Same reference numerals in the drawings denote same or similar structures and thus, their detailed description will be omitted.

Furthermore, the described features, structures, or characteristics may be combined in one or more embodiments in any suitable manner. In the following description, many specific details are provided so that the embodiments of the present disclosure can be fully understood. However, those skilled in the art will realize that the technical solutions of the present disclosure may be practiced without one or more of the specific details, or other methods, components, materials, devices, steps, etc. may be used. In other instances, well-known structures, methods, devices, implementations, materials, or operations have not been shown or described in detail to avoid obscuring aspects of the present disclosure.

The terms "a", "an", "the", "said", and "at least one" are used to indicate the presence of one or more elements/components/etc. The terms "include" and "have" are used to indicate an open-ended inclusion and that there may be additional elements/component/etc. in addition to the listed elements/components/etc.

Figure 1:
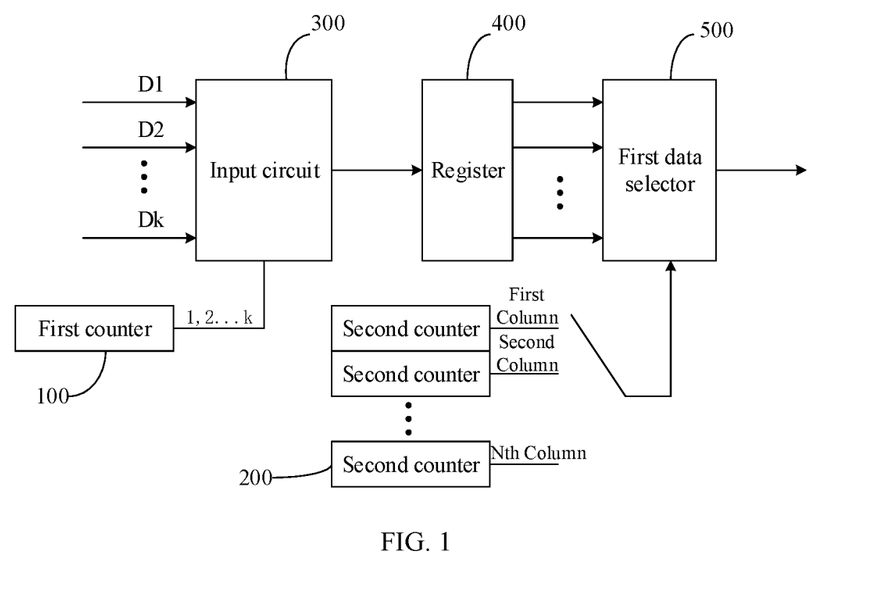
FIG. 1 is a schematic diagram of a matrix transposition device provided by an exemplary embodiment of the present disclosure.

First, as shown in FIG. 1, an example embodiment provides a matrix transposition device that includes a first counter 100, an input circuit 300, a plurality of second counters 200, and a first data selector 500.

The first counter 100 is configured to number a matrix element and output a first signal. The input circuit 300 is coupled to the first counter 100, and is input with the matrix element after receiving the first signal. Each column of matrix elements corresponds to one of the second counters 200, each of the second counters 200 outputs a set of second signals, and each set of the second signals includes number information of the matrix elements in a column corresponding to the second counter 200. Also, the first data selector 500 has an input end coupled to the input circuit 300 and a selection end coupled to the plurality of second counters 200, which receives the second signals in an order of columns of a matrix, and orderly outputs column elements of the matrix corresponding to each set of the second signals as row elements of a transposed matrix.

The matrix transposition device provided by the example embodiment numbers the matrix element through the first counter 100 to output the first signal to control the input circuit 300 to be input with the matrix element, and respectively outputs, through a plurality of counting units, the second signals in the order of the columns of the matrix to control the first data selector 500 to output, according to the order of the columns of the matrix, the column element of the matrix as the row elements of the transposed matrix, so that the transposition of the matrix is completed, which solves the problem in the related art that since the matrix transposition is carried out by means of dual-port RAM or ROM or the like, for a small amount of data, it will consume too much logic resources and it is not easy to be implemented as a circuit. In addition, the first counter 100, the second counter 200, the input circuit 300 and the first data selector 500 belong to a same circuit, which avoids that in the related art, a control signal and a data circuit do not belong to a same circuit system, resulting in a synchronization of the control signal and the data circuit, avoids the influence of external noise on the control signal and improves the accuracy and stability of the matrix transposition. Further, the matrix transposition device has a simple circuit implementation and thus is easy to be implemented by IC, may save resources and development costs while ensuring data accurate, and may effectively avoid interference of external noise.

In the process of the matrix transposition, the matrix element is first counted by the first counter 100. The first counter 100 outputs an enable signal for each count. The data input unit receives the enable signal and is input with one datum. At this time, the matrix element corresponds to the count value of the counter one by one, that is, the numbering of the matrix elements is completed. The first counter 100 may be a counter, and the first data selector 500 may be a multiplexer MUX.

The matrix elements may be input in an order of rows of the matrix, for example, as for the following matrix 1:

$$\begin{bmatrix} D1 & D2 & D3 \\ D4 & D5 & D6 \\ D7 & D8 & D9 \\ D10 & D11 & D12 \end{bmatrix} \quad (1)$$

The matrix elements may be input in the order of D1, D2, D3, D4, D5, D6, D7, D8, D9, D10, D11, D12, and the result of numbering the matrix elements by the first counter 100 is shown in Table 1.

TABLE 1

| Matrix Elements | D1 | D2 | D3 | D4 | D5 | D6 | D7 | D8 | D9 | D10 | D11 | D12 |
|---|---|---|---|---|---|---|---|---|---|---|---|---|
| Serial number | 1 | 2 | 3 | 4 | 5 | 6 | 7 | 8 | 9 | 10 | 11 | 12 |

The second counter 200 outputs a second signal. The second counter 200 outputs one second signal for each count. For the plurality of second counters 200, each of the second counters 200 corresponds to one column of the matrix elements, and when the plurality of second counters 200 output the second signals, the second counter 200 corresponding to the column elements of each column of the matrix is sequentially selected according to the order of the columns of the matrix to output the second signal. The plurality of second counters 200 may be numbered, and the second signal output by each of the numbered second counters 200 corresponds to a serial number of one column of matrix elements. For example, the correspondence between the second counters 200 and the matrix elements may be shown in Table 2.

TABLE 2

| Second counting unit | 1 | 2 | 3 |
|---|---|---|---|
| Serial number of matrix elements | 1, 4, 7, 10 | 2, 5, 8, 11 | 3, 6, 9, 12 |

The second counter 200 may be a counter, and the correspondence between the second signal and the numbering of the column elements of the matrix may be realized by interval counting of the counter. The number of the second counters 200 is the same as the number of the columns of the matrix. The counting interval of the second counter 200 is determined by the number of the columns of the matrix elements. The counting interval is N-1, where N is the total number of the columns of the matrix elements. The second counter 200 corresponding to the nth column of the matrix counts from n with the counting interval N-1. When the second counter 200 counts, it outputs the second signal to the first data selector 500, and the first data selector 500 outputs the matrix element corresponding to the serial number according to the serial number of the matrix element carried in the second signal.

For example, for the above 3×4 matrix, the second counter 200 corresponding to a first column counts from the matrix element with the serial number 1 with the counting interval 2, that is, the serial numbers of the matrix elements counted by the second counter 200 are 1, 4, 7, 10. When the second counter 200 counts, it outputs the second signal, and the first data selector 500 outputs the matrix element corresponding to the serial numbers of the matrix element carried in the second signal of the second counter 200 according to the second signal, to output first column elements of the matrix as a first row elements of a transposed matrix. The second counter 200 corresponding to a third column counts from the matrix element with the serial number 3 with the counting interval 2, that is, the serial numbers of the matrix elements counted by the second counter 200 are 3, 6, 9, 12. When the second counter 200 counts, it outputs the second signal, and the first data selector 500 outputs the matrix element corresponding to the serial numbers of the matrix element carried in the second signal of the second counter 200 according to the second signal, to output a third column elements of the matrix as third row elements of the transposed matrix.

Figure 2:
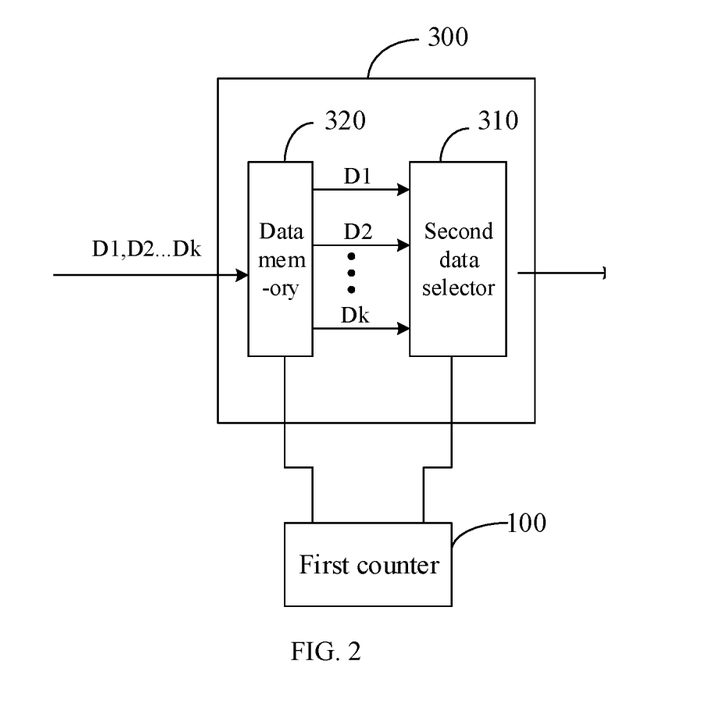
FIG. 2 is a schematic diagram of an input circuit provided by an exemplary embodiment of the present disclosure.

As shown in FIG. 2, the input circuit 300 may include a data memory 320 and a second data selector 310. The data memory 320 is configured to store the matrix element input, and has an output end coupled to the second data selector 310. The second data selector 310 has a selection end coupled to the first counter 310 and is configured to receive the first signal and be input with the matrix element from the data memory 320. The second data selector 310 is input with the matrix element according to the counting order of the first counter 100. The number of channels of the second data selector 310 may be determined by the number of elements contained in the matrix, and the number of the channels of the second data selector 310 may be equal to the number of the matrix elements. For example, for a 3×4 matrix, the number of the channels of the second data selector 310 may be 12. Of course, in practical applications, the number of the channels of the second data selector 310 may also be greater than the total number of elements contained in the matrix. In order to facilitate the transposition of a matrix with a larger number of elements, or as a backup channel, the embodiment of the present disclosure is not specifically thereto.

Figure 3:
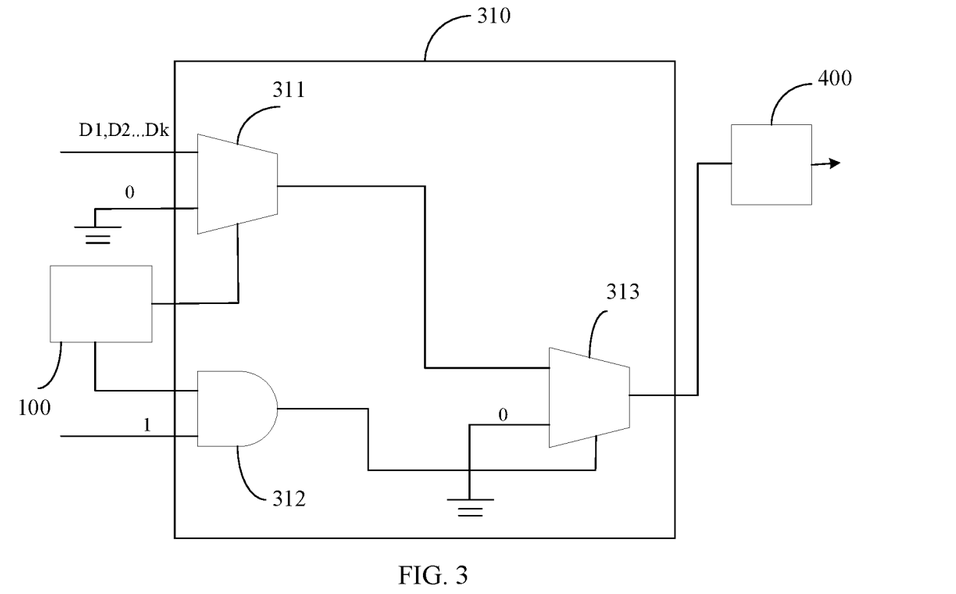
FIG. 3 is a schematic diagram of a second data selector provided by an exemplary embodiment of the present disclosure.

FIG. 3 is a circuit diagram of a second data selector 310 provided by an embodiment of the present disclosure. As shown in FIG. 3, the second data selector 310 may include a first multiplexer 311, an AND gate unit 312, and a second multiplexer 313. The first multiplexer 311 has a selection end coupled to the first counter 100 and an input end to be input with the matrix element when receiving the first signal. The AND gate unit 312 has one input end coupled to the first counter 100 and another input end to be input with a fixed value of 1. The second multiplexer 313 has an input end coupled to an output end of the first multiplexer 311 and a selection end coupled to an output end of the AND gate unit 312, and is configured to stop outputting when the first counter 100 is cleared. Through this circuit, intermittent operation of the matrix transposition device is realized, that is, the matrix transposition device operates when the first counter 100 operates, and after the first counter 100 is cleared, the matrix transposition device stops operating to reduce the power consumption of the matrix transposition circuit.

Further, the matrix transposition device provided by an embodiment of the present disclosure may further include a register 400, having an input end coupled to the input circuit 300 and an output end coupled to the first data selector 200, and configured to store the matrix element as numbered.

Figure 4:
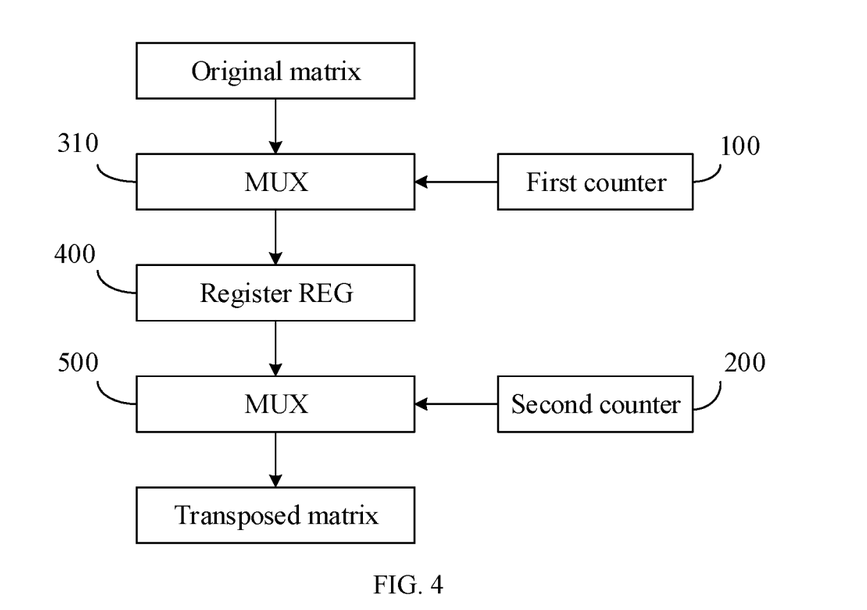
FIG. 4 is a schematic block diagram of an operating process of a matrix transposition device provided by an exemplary embodiment of the present disclosure.

The operating flow of the matrix transposition device provided by the embodiment of the present disclosure is shown in FIG. 4. The first counter 100 counts the matrix element, and controls the second data selector 310 to be input with the matrix element to complete the numbering of the matrix elements. The numbered matrix element is stored in the register 400, the second counter 200 performs an interval counting on the numbered matrix elements, and the first data selector 500 is controlled to output the matrix elements in an transposed order to obtain the transposed matrix.

Figure 5:
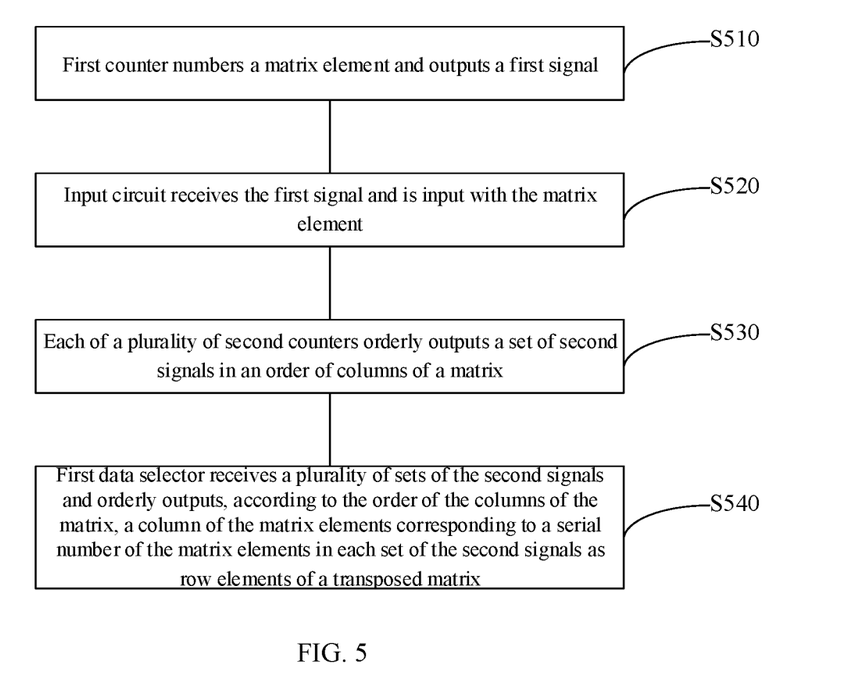
FIG. 5 is a flowchart of a matrix transposition method provided by an exemplary embodiment of the present disclosure.

An example embodiment further provides a matrix transposition method, which includes the following steps, as shown in FIG. 5.

In step S510, a first counter numbers a matrix element and outputs a first signal.

In step S520, an input circuit receives the first signal and is input with the matrix element.

In step S530, each of a plurality of second counters orderly outputs a set of second signals in an order of columns of a matrix.

In step S540, a first data selector receives a plurality of sets of the second signals and orderly outputs, according to the order of the columns of the matrix, a column of the matrix elements corresponding to a serial number of the matrix elements in each set of the second signals as row elements of a transposed matrix.

The matrix transposition method provided by the example embodiment numbers the matrix element through the first counter 100 to output the first signal to control the input circuit 300 to be input with the matrix element, and respectively outputs, through a plurality of counting units, the second signals in the order of the columns of the matrix to control the first data selector 500 to output, according to the order of the columns of the matrix, the column elements of the matrix as the row elements of the transposed matrix, so that the transposition of the matrix is completed, which solves the problem in the related art that since the matrix transposition is carried out by means of dual-port RAM or ROM or the like, for a small amount of data, it will consume too much logic resources and it is not easy to be implemented as a circuit. In addition, the first counter 100, the second counter 200, the input circuit 300 and the first data selector 500 belong to a same circuit, which avoids that in the related art, a control signal and a data circuit do not belong to a same circuit system, resulting in asynchronization of the control signal and the data circuit, avoids the influence of external noise on the control signal and improves the accuracy and stability of the matrix transposition.

In step S510, the first counter numbers the matrix element and outputs the first signal.

The first counter 100 counts the matrix element, and uses a count value of the counter as a serial number of the corresponding matrix element. The first counter 100 outputs one first signal for each count. The first counter 100 sequentially numbers the matrix elements according to the row order of the matrix.

In step S520, the input circuit receives the first signal and is input with the matrix element.

The input circuit 300 may include a second data selector 310, and the second data selector 310 includes a first multiplexer 311, an AND gate unit 312, and a second multiplexer 313.

The first multiplexer 311 receives the first signal, is input with the numbered matrix elements, and transmits the numbered matrix element to the second multiplexer 313. The second multiplexer 313 outputs the numbered matrix element, and after the first counter 100 is cleared, the AND gate unit 312 outputs 0, and the second multiplexer 313 stops outputting.

In step S530, each of the plurality of second counters orderly outputs a set of second signals in the order of the columns of the matrix.

The number of the second counter 200 may be determined by the number of the columns of the matrix. The second signal is a signal output when the second counter 200 counts, which includes the serial number of the matrix element currently counted by the second counter 200. The plurality of second counters 200 sequentially output a set of second signals according to the order of the columns of the matrix.

The second counter 200 counts with intervals, and the second counter 200 corresponding to the nth column of the matrix counts from n with the counting interval N-1.

In step S540, the first data selector receives a plurality of sets of the second signals and orderly outputs, according to the order of the columns of the matrix, the column of the matrix elements corresponding to the serial numbers of the matrix elements in each set of the second signals as the row elements of the transposed matrix.

An input end of the first data selector 500 is coupled to the register 400, the numbered matrix element in the register 400 is input to the first data selector 500, the first data selector 500 receives the second signal, and according to the serial number of the matrix element carried in the second signal, outputs the matrix element corresponding to the serial number. Since each set of second signals carries the number information of the column of the matrix elements, the first data selector 500 can output the elements according to the set of second signals as row elements of the transposed matrix. After the transposition, the row number of the column elements is the same as the column number of the original matrix, and the transposition of the matrix is completed.

It should be noted that although the steps of the method in the present disclosure are described in a specific order in the drawings, this does not require or imply that the steps must be performed in the specific order, or all the steps shown must be performed in order to achieve a desired result. Additionally or alternatively, some steps may be omitted, multiple steps may be combined into one step for execution, and/or one step may be decomposed into multiple steps for execution, and so on.

Figure 6:
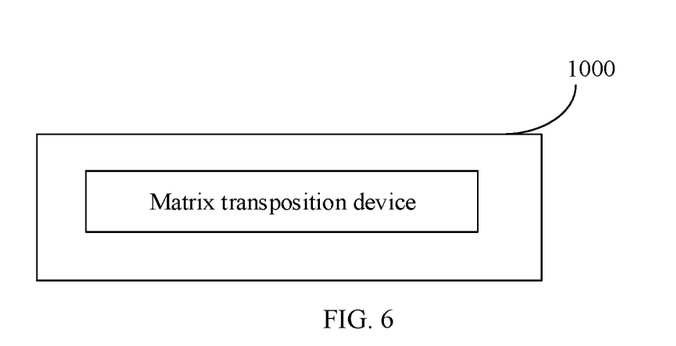
FIG. 6 is a block diagram of a display device provided by an exemplary embodiment of the present disclosure.

As shown in FIG. 6, the present exemplary embodiment also provides a display device 1000, including the matrix transposition device provided by the embodiment of the present disclosure. In practical applications, the display device may further include a display panel, a control circuit, etc. They are known in the art, which will not be repeated in the embodiment of the present disclosure.

Those skilled in the art may conceive of other embodiments of the present disclosure after considering the description and practicing the invention disclosed herein. This application is intended to cover any variations, uses, or adaptive changes of the present disclosure that follow the general principles of the present disclosure and include the common knowledge or customary technical means in the technical field not disclosed in the present disclosure. The description and examples are to be considered exemplary only, and the true scope and spirit of the present disclosure are pointed out by the appended claims.

It should be understood that the present disclosure is not limited to the precise structure that has been described above and shown in the drawings, and that various modifications and changes can be made without departing from the scope thereof. The scope of the present disclosure is limited only by the appended claims.

The invention claimed is:

1. A matrix transposition device, comprising:
   a first counter configured to number a matrix element and output a first signal;
   an input circuit coupled to the first counter, and configured to receive the matrix element as input in response to receiving the first signal;
   a plurality of second counters, wherein each column of the matrix element corresponds to one of the second counters, each of the second counters outputs a set of second signal, and the set of second signal comprises number information of the matrix element in a column corresponding to a respective one of the second counters; and a first data selector having an input end coupled to the input circuit and a selection end coupled to the plurality of second counters, and configured to receive the second signal in an order of column of a matrix, and orderly output a column element of the matrix corresponding to the set of second signal as a row element of a transposed matrix, wherein the input circuit further comprises: a second data selector having a selection end coupled to the first counter and configured to receive the first signal and the matrix element.

2. The matrix transposition device according to claim 1, wherein the second data selector comprises:
a first multiplexer having a selection end coupled to the first counter and an input end configured to receive the matrix element as the input in response to receiving the first signal;
an AND gate unit having one input end coupled to the first counter and another input end configured to receive a fixed value of 1; and
a second multiplexer having an input end coupled to an output end of the first multiplexer and a selection end coupled to an output end of the AND gate unit, and configured to stop outputting when the first counter is cleared.

3. The matrix transposition device according to claim 1, wherein a number of channels of the second data selector is greater than or equal to a total number of the matrix element.

4. The matrix transposition device according to claim 1, wherein the input circuit further comprises: a data memory configured to store the matrix element input, and having an output end coupled to the second data selector.

5. The matrix transposition device according to claim 1, further comprising: a register having an input end coupled to the input circuit and an output end coupled to the first data selector, and configured to store the matrix element as numbered.

6. The matrix transposition device according to claim 1, wherein a number of the second counters is the same as a number of the column of the matrix, wherein each of the second counters corresponds to one column of the matrix element.

7. The matrix transposition device according to claim 6, wherein at least one of the second counters counts once every N-1 element intervals from a serial number of the column corresponding to the respective one of the second counters, and outputs one of the second signal, where N is the number of the column of the matrix, and the second signal comprises the serial number of the matrix element currently counted.

8. The matrix transposition device according to claim 7, wherein the first data selector receives the second signal and outputs the matrix element corresponding to the serial number of the matrix element in the second signal.

9. A matrix transposition method, comprising:
numbering a matrix element and outputting a first signal through a first counter;
inputting the matrix element to an input circuit in response to the input circuit receiving the first signal;
orderly outputting a set of second signal in an order of column of a matrix through each of a plurality of second counters; and
receiving, by a first data selector, the set of the second signal and orderly outputting, according to the order of the column of the matrix, a column of the matrix element corresponding to a serial number of the matrix element in the set of the second signal as a row element of a transposed matrix, wherein inputting the matrix element to the input circuit in response to the input circuit receiving the first signal further comprises:
receiving, by a first multiplexer, the first signal, inputting the matrix element as numbered to the first multiplexer, and transmitting, by the first multiplexer, the matrix element as numbered to a second multiplexer; and
outputting, by the second multiplexer, the matrix element as numbered, wherein after the first counter is cleared, an AND gate unit outputs 0 and the second multiplexer stops outputting.

10. The matrix transposition method according to claim 9, wherein numbering the matrix element and outputting the first signal through the first counter further comprises: counting and numbering the matrix element, and outputting one of the first signal for each count through the first counter.

11. A display device, comprising:
a matrix transposition device, wherein the matrix transposition device comprises:
a first counter configured to number a matrix element and output a first signal;
an input circuit coupled to the first counter, and configured to receive the matrix element as input in response to receiving the first signal;
a plurality of second counters, wherein each column of the matrix element corresponds to one of the second counters, each of the second counters outputs a set of second signal, and the set of second signal comprises number information of the matrix element in a column corresponding to the second counter; and
a first data selector having an input end coupled to the input circuit and a selection end coupled to the plurality of second counters, and configured to receive the second signal in an order of column of a matrix and orderly output a column element of the matrix corresponding to the set of second signal as a row element of a transposed matrix,
wherein the input circuit further comprises: a second data selector having a selection end coupled to the first counter and configured to receive the first signal and the matrix element.

12. The display device according to claim 11, wherein the second data selector comprises:
a first multiplexer having a selection end coupled to the first counter and an input end configured to receive the matrix element as the input in response to receiving the first signal;
an AND gate unit having one input end coupled to the first counter and another input end configured to receive a fixed value of 1; and
a second multiplexer having an input end coupled to an output end of the first multiplexer and a selection end coupled to an output end of the AND gate unit, and configured to stop outputting when the first counter is cleared.

13. The display device according to claim 11, wherein a number of channels of the second data selector is greater than or equal to a total number of the matrix element.

14. The display device according to claim 11, wherein the input circuit further comprises: a data memory configured to store the matrix element input, and having an output end coupled to the second data selector.

15. The display device according to claim 11, wherein the matrix transposition device further comprises: a register having an input end coupled to the input circuit and an output end coupled to the first data selector, and configured to store the matrix element as numbered.

16. The display device according to claim 11, wherein a number of the second counters is the same as a number of the column of the matrix, wherein each of the second counters corresponds to one column of the matrix element.

17. The display device according to claim 16, wherein the second counters count once every N-1 element intervals from a serial number of the column corresponding to the second counter, and output one of the second signal, where N is the number of the column of the matrix, and the second signal comprises the serial number of the matrix element currently counted.

* * * * *